Sept. 5, 1950  E. D. SWISHER  2,521,266
VEHICLE JACK
Filed April 11, 1946
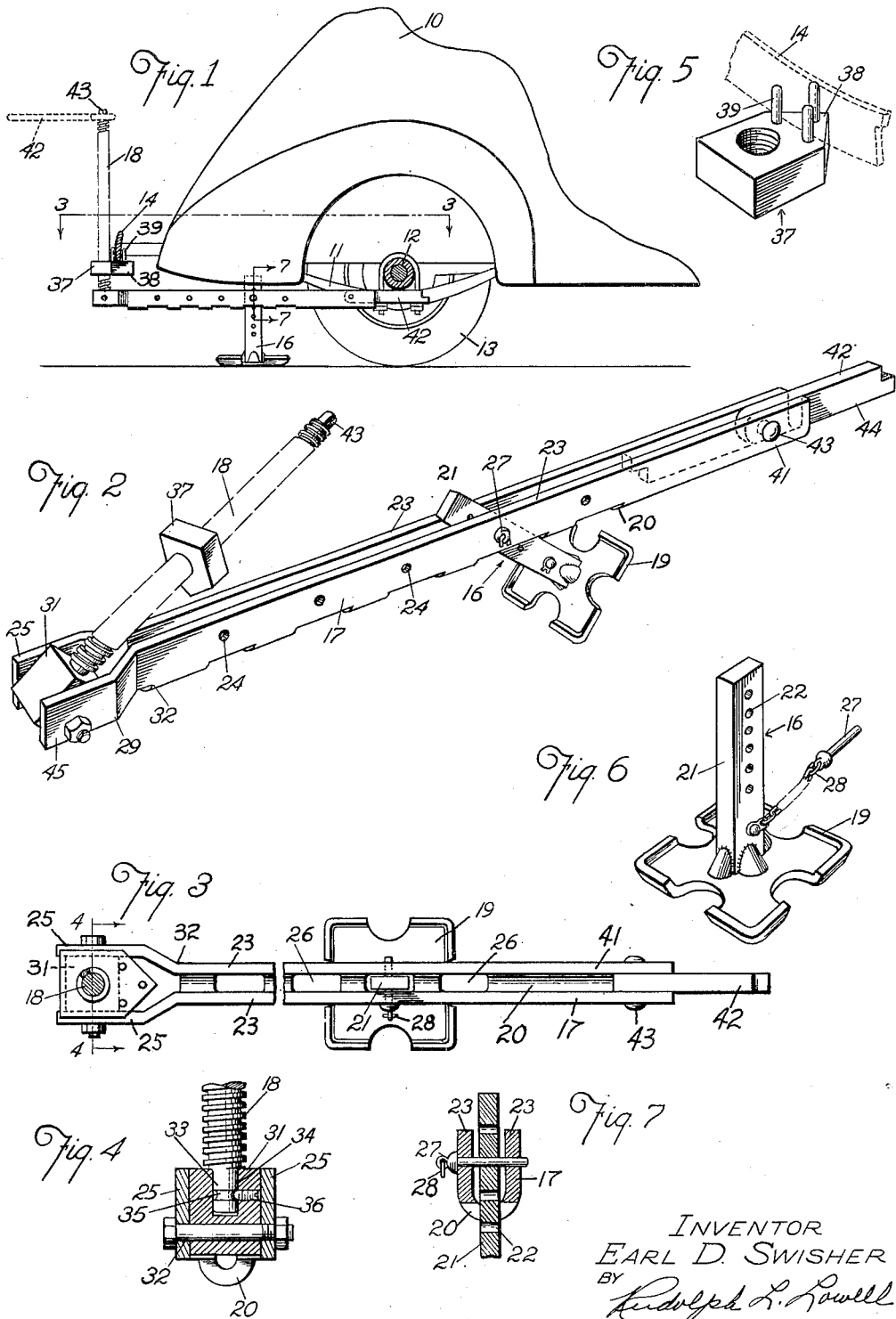
INVENTOR
EARL D. SWISHER
BY
Rudolph L. Lowell
ATTY Patented Sept. 5, 1950

2,521,266

UNITED STATES PATENT OFFICE 2,521,266

VEHICLE JACK

Earl D. Swisher, Des Moines, Iowa

Application April 11, 1946, Serial No. 661,407

2 Claims. (Cl. 254—119)

This invention relates generally to vehicle jacks and in particular to a combination bumper and axle jack for an automobile.

Bumper jacks now in common use, generally engage only the bumper so that when an automobile is lifted, the body spring is first extended before a wheel is raised from the ground. As a result the automobile body is lifted to an appreciable height, and since its raised end is carried on only a single upright support of the jack care must be exercised in the raising of the automobile, and in working on the automobile to avoid having the automobile fall from the jack.

The bumper jack has generally superseded in use the so-called "axle" jack by virtue of the fact that late model automobiles have a lower ground clearance than earlier model automobiles. Although axle jacks, because of their direct action on a wheel axle, eliminate an extension of the body spring before a desired wheel is elevated, their use on later model automobiles is generally inconvenient because of the necessity of the operator having to get in a substantially crawling position to "spot" the jack under the axle. However, although the bumper jack has done away with the inconvenience of such "spotting" procedure, and is operated while the operator is in a substantially standing position, bumper jacks thus far used have not overcome the objection to extending the body spring, and in turn raising an end of the automobile to a precarious angle, before the wheel at the lifted automobile end is in a ground clearance relation with the ground.

It is an object of this invention, therefore, to provide an improved automobile jack.

A further object of this invention is to provide a jack which acts concurrently on a wheel axle and on an adjacent bumper to elevate a wheel of an automobile, so as to reduce the extension of the body spring during a wheel lifting operation.

Another object of this invention is to provide a bumper operated jack which is adapted to lift on both the bumper and the wheel axle to elevate a wheel without raising the automobile body to an undesirably high position.

Still another object of this invention is to provide a bumper operated jack which is of a simple and compact construction, adapted to efficiently lift on both a bumper and an adjacent wheel axle to raise a wheel above the ground without tilting the automobile body at a steep angle, and capable of being conveniently operated from a position adjacent to the bumper and while the operator is in a substantially standing position.

A feature of this invention is found in the provision of an automobile jack in which a substantially horizontal lever member, pivotally supported on an upright stand and of a length substantially equal to the distance between a bumper and an adjacent axle, has one end engageable with the under side of the axle and a screw at its other end provided with a nut member which is engageable with the under side of the bumper, so that on rotation of the screw a lifting force is applied through the lever on both the bumper and the axle.

Further objects, features and advantages of this invention will become apparent from the following description when taken in connection with the accompanying drawings in which:

Fig. 1 is a fragmentary side elevational view of the rear portion of an automobile, with a rear wheel and a part of the rear axle broken away, and showing the jack of this invention in assembly relation therewith;

Fig. 2 is a perspective view of the jack in a folded or storage position;

Fig. 3 is a plan top view of the jack;

Fig. 4 is an enlarged sectional detail view taken on the line 4—4 in Fig. 3;

Fig. 5 is a perspective view of a bumper engaging member, which forms part of the jack of this invention, shown in assembly relation with the automobile bumper;

Fig. 6 is a perspective view of the jack supporting stand; and

Fig. 7 is an enlarged fragmentary sectional view taken on the line 7—7 in Fig. 1;

With reference to the drawings the jack of this invention is illustrated in Fig. 1, as applied to the rear end of an automobile having a body 10, supported through usual semi-elliptical body springs 11, on a rear wheel axle 12 for carrying wheels 13. The body 10 is equipped with a usual rear bumper 14. Although only the rear end portion of an automobile is shown in Fig. 1, it is to be understood that the jack of this invention is adapted to be used in a similar manner on the front axle of the automobile.

The jack (Figs. 1 and 2) includes a stand 16, a lever arm 17 and an operating jack screw 18. The stand 16 (Fig. 3) has a base 19, adapted to rest on the ground surface, and an upright support 21, of a flat bar material, formed with a series of longitudinally spaced holes 22.

The lever arm 17 (Figs. 2, 3 and 7) is of a substantially U-shape in cross section with the legs 23 thereof being formed with oppositely arranged longitudinally spaced openings 24 of a size corresponding substantially to the size of the openings 22 in the upright support 21 of the stand 16. The base portion 20, of the lever arm 17, is provided with a series of longitudinally spaced slots 26 corresponding to the pairs of oppositely arranged openings 24 in the legs 23. Each slot 26 is of a size to loosely receive the upright support 21 for a purpose which will appear later.

In the assembly of the jack the upright support 21 is extended through one of the slots 26 and a pin 27, which is secured through a chain or the like 28 to the stand 16, is inserted through a pair of the openings 24 and an aligned opening 22 in the upright support 21 to pivotally support the lever arm 17 on the stand 16 for pivotal up and down movement.

The leg members 23, at the lever end 29 are flared outwardly away from each other (Figs. 2, 3 and 4) to loosely receive therebetween a bearing block 31. The bearing block 31 is pivotally supported on a shaft or bolt 32 carried in the flared leg extensions 25 so that the block 31 is pivotally movable in a plane extended longitudinally of the lever arm 17. The base 20, of the lever arm 17, terminates at the junction 32 of the legs 23 and the flared extensions 25, to provide for a free pivotal movement of the bearing block between the leg extensions 25.

The lower end of the screw 18 (Fig. 4) is provided with a shaft 33 which is rotatable within a central bore 34 formed in the top side of the bearing block 31. The screw 18 is retained against axial movement outwardly from the bearing block 31 by a set screw 36 threaded in the block member 31, and having its inner end receivable within an annular groove 35 formed in the shaft 33.

Threadable on the screw 18 is a nut 37 (Figs. 1, 2 and 5) having a lateral projection 38 adapted to engage the underside of the automobile bumper 14. Upright pins 39 on the nut projection 38 are arranged in a spaced relation to receive the bumper 14 therebetween, whereby the bumper is positively held against slipping or falling off of the nut 37, and the nut is held against rotation, during the operation of the jack.

The lever arm 17 at its end 41 (Figs. 1, 2 and 3) carries a pivoted extension 42, which is pivoted at one end on a pin 43, carried in the legs 23 of the lever arm 17, for pivotal movement in a counter-clockwise direction, as viewed in Fig. 2, to a position within the lever arm 17 and between the legs 23 thereof, and in an opposite direction to a position extended outwardly in longitudinal alignment with the lever arm 17. In its extended position, as shown in full lines in Figs. 1 and 2, the lower edge 44, of the extension 42 is engageable with the top side of the base 20 of the lever arm 17.

In the operation of the jack assume that the rear wheel 13 illustrated in Fig. 1 is to be elevated. The extension 42 is moved to its full line position, as shown in Fig. 2, so that the lever arm 17 is of a length substantially equal to the distance between the rear bumper 14 and the adjacent rear axle 12. The upright support 21 is then inserted through one of the slots 26 in the base 20, such that the portion of the lever arm between the stand 16 and the rear axle 12 is of a length substantially equal to or less than the length of that portion of the lever arm 17 between the stand 16 and the screw 18.

This arrangement of the upright support at a substantially center position on the lever arm 17, or between such center position and the axle is for the purpose of obtaining an increased leverage effect for the force applied on the lever arm by the screw 18 as will appear later.

The support 21 is extended through such slot 26 until the lever arm 17, in its substantially horizontal position as illustrated in Fig. 1, has its top edge below the bottom side of the rear axle 12, when the stand is supported on the ground. The pin 27 is then inserted through a hole 22, in the upright 16, which is in alignment with the openings 24 at the selected slot 26.

With the lever arm 17 and the stand 16 thus relatively assembled, the nut 37 is threaded downwardly on the screw 18 to a position such that the bumper 14 is positionable between the upright pins 39 on the nut projection 38. With the bumper 14 supported on the nut 37, and with the lever arm extension 42 engageable with the under side of the axle 12 the screw 18 is rotated in a clockwise direction, as viewed in Fig. 3, so as to be axially movable relative to the nut 37 which is retained against rotation by the engagement of the pins 39 with the bumper 14. Rotation of the screw 18 is accomplished by a usual type wrench 42 adapted for engagement with a nut portion 43 at the top of the screw 18.

On rotation of the screw 18 a force is applied downwardly on the end 29 of the lever arm 17 concurrently with the upward application of forces on the bumper 14 and on the axle 12. As a result of this application of lifting forces, the car body 10 is lifted directly at the bumper 14, while the axle 12 is lifted directly at the lever extension 42, so that both the automobile wheel 13 and the body 10 are raised with a minimum of extension of the body spring 11. In other words, the axle 12 and the body 10 are concurrently raised so that the spring 11 is retained in a substantially normal relation relative to the axle 12 and the body 10.

Since the screw 18 is in an upright position rearwardly of the bumper 14 its rotation is accomplished while the operator is in a substantially standing position. As a result the jack is conveniently operated while eliminating a lifting of the body 10 to an unnecessarily high elevation in order to raise the wheel 13 in a clearance relation with the ground. To lower the wheel 13 to the ground, the screw 18 is rotated in a counter-clockwise direction, as viewed in Fig. 3, until the nut 37 is out of an engaging position with the bumper 14.

In applying the jack of this invention to a front wheel axle the extension 42 is initially moved to its dotted line position shown in Fig. 2, since the distance between the front wheel axle and its adjacent bumper is normally less, on most automobiles, than the distance between the rear bumper and its adjacent rear axle. With the extension 42 in its dotted line position, the jack is set up for operation relative to the front axle in all ways similar to its operation relative to the rear axle 12 as described in connection with Fig. 1.

From a consideration of the above description it is seen that the invention provides a combination bumper and axle jack which is comprised of a minimum number of parts capable of being assembled together to accommodate automobiles having varying distances between a bumper and an adjacent axle. When the jack is not in use, the screw 18 and the stand 16 are movable to positions adjacent to the lever arm 17, as shown in Fig. 2, so that the complete jack occupies a relatively small amount of space for storage.

Although the invention has been described with respect to a preferred embodiment thereof it is to be understood that it is not to be so limited since changes and modifications can be made therein which are within the full intended scope of this invention as defined by the appended claims.

I claim:

1. A jack for an automobile having a wheel axle and a bumper adjacent to said axle, said jack comprising an upright support adapted to rest on a ground surface, a lever member pivotally supported intermediate its ends on said upright support for up and down pivotal movement, a transverse pivot adjacent one end of said lever, supporting means pivoted on said transverse pivot, a jack screw having its lower end rotatable in said supporting means, and a nut member threadable on said screw having a portion engageable with the under side of said bumper, with the opposite end of said lever member being adapted to engage the under side of said wheel axle.

2. A jack for an automobile having a wheel axle and a bumper, comprising an upright support adapted to rest on a ground surface, a lever arm of a substantially U-shape in cross section having a series of longitudinally spaced openings in the base thereof, with each of said openings being adapted to receive said upright support therein, and the leg members of said lever arm having a series of oppositely arranged openings corresponding to said longitudinally spaced openings, said upright support having a series of longitudinally spaced openings therein, a pivot member receivable through an opening in said upright support and opposite openings in said leg members to pivotally support said lever arm intermediate its ends for up and down pivotal movement, a jack screw supported adjacent one end of said lever arm for rotational movement, and for pivotal movement longitudinally of said lever arm, and a bumper engaging member threadable on said screw, with the other end of said lever arm being engageable with said wheel axle.

EARL D. SWISHER.

REFERENCES CITED

The following references are of record in the file of this patent:

UNITED STATES PATENTS

| Number | Name | Date |
|---|---|---|
| 778,179 | Edeline | Dec. 20, 1904 |
| 1,254,797 | Gries | Jan. 29, 1918 |
| 1,553,074 | Engel | Sept. 8, 1925 |